UNITED STATES PATENT OFFICE.

FILIP KAČER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 863,401.          Specification of Letters Patent.          Patented Aug. 13, 1907.

Application filed May 9, 1907. Serial No. 372,713.

*To all whom it may concern:*

Be it known that I, FILIP KAČER, doctor of philosophy and chemist, subject of the King of Prussia, residing at Mannheim, Germany, have invented new and useful Improvements in Anthracene Dyes and Process of Making Same, of which the following is a specification.

My invention relates to the production of coloring matters of the anthracene series.

I have discovered that by treating 1-acetyl-amido-anthraquinone, or a derivative thereof which contains halogen in the anthraquinone residue, with an acid chlorid such for instance as phosphorus oxychlorid, phosphorus pentachlorid, and sulfuryl chlorid, and then heating the compounds obtained, either alone or in the presence of a condensing agent and either in the presence or not of a suitable solvent or diluting agent, I can obtain new coloring matters. If desired, the acetylation of the amido-anthraquinone body and the treatment with the acid chlorid can be caused to take place in one operation.

My new coloring matters possess the following general characteristics. They are extremely difficultly soluble in organic solvents, insoluble in caustic soda solution, and soluble in sulfuric acid yielding from red to brown-red solutions. They dissolve in alkaline hydrosulfite solution yielding yellow-brown vats which color cotton dull brown shades. These shades, however, upon washing, become first greenish yellow and then gradually, or more quickly by treatment with dilute sodium hypochlorite solution, become orange to brown. The dyed fiber becomes blue upon treating it with a neutral hydrosulfite solution.

I have further discovered that when preparing coloring matter from a 2-halogen-1-acetyl-amido-anthraquinone body it is not necessary to treat such body first with an acid chlorid, but that by subjecting said body to the subsequent treatment as described above, that is to say by heating it either alone or in the presence of a condensing agent, and either in the presence or not of a suitable solvent, or diluting agent, it can be directly converted into coloring matter possessing the same general characteristics as above described.

The conversion into coloring matter of the 2-halogen-1-acetyl-amido-anthraquinone bodies or of the compounds obtained by treating a 1-acetyl-amido-anthraquinone body with acid chlorid can be caused to take place by heating such bodies for some time above their melting points; the coloring matter can be obtained from the resulting melt by extraction with nitrobenzene, or by heating with sodium hypochlorite solution which removes impurities. The coloring matters can, however, be obtained directly in a more pure form and in better yield by carrying out the reaction in the presence of a solvent, or diluting agent, such for instance as nitrobenzene and naphthalene, if desired, adding to the melt a condensing agent, such for instance as sodium acetate, potassium acetate, lead acetate, aluminium chlorid, ferric chlorid, sodium carbonate, quicklime, lead oxid, or a mixture of sodium acetate and cuprous chlorid.

The following examples will serve to illustrate further the nature of my invention and how it can be carried into practical effect, but my invention is not confined to these examples. The parts are by weight.

*Example 1.* Introduce ten (10) parts of 1-acetyl-amido-anthraquinone into twenty-five (25) parts of boiling phosphorus oxychlorid and continue boiling the whole, in a reflux apparatus, until the solution which is at first formed is converted into a yellow crystalline mass. Treat this mass with water and filter off the compound formed and dry it, and introduce ten (10) parts thereof into one hundred and fifty (150) parts of boiling nitrobenzene. Add four (4) parts of aluminium chlorid and boil the whole for one (1) hour. When the mixture is cool, add one hundred and fifty (150) parts of alcohol and then filter off, and wash with alcohol, and dry the coloring matter which separates out. From the hydrosulfite vat it dyes cotton orange-yellow shades.

*Example 2.* Mix together thirteen (13) parts of 1-amido-2.4-di-brom-anthraquinone, forty (40) parts of acetic anhydrid and ten (10) parts of phosphorus oxychlorid, and boil the whole gently until the reaction is finished. Then introduce the mixture, slowly, while stirring, into about one hundred (100) parts of water at a temperature of from sixty (60), to seventy (70), degrees centigrade, and filter off and wash and dry the compound formed which can then be purified by recrystallization from an organic solvent, or by dissolving it in sulfuric acid and then precipitating it. Then introduce ten (10) parts of this compound into two hundred (200) parts of boiling nitrobenzene, add two (2) parts of cuprous chlorid, and boil the whole for two (2) hours. On working up the reaction mixture, as described in the foregoing example 1, a coloring matter is obtained which possesses properties similar to those of the coloring matter obtained according to the said example 1.

*Example 3.* Boil together in a reflux apparatus for one (1) hour, on the water bath, ten (10) parts of 1-amido-anthraquinone and forty (40) parts of sulfuryl chlorid ($SO_2Cl_2$), whereupon the amido-anthraquinone is chlorinated. Then add to the brownish yellow magma obtained ten (10) parts of acetic anhydrid and continue warming until a dark red solution is obtained. Then add fifty (50) parts of sulfuric acid and pour the whole into ice, or into water, and filter off and dry the compound which is thereby precipitated. Introduce ten (10) parts of this compound into one hundred and fifty (150) parts of boiling nitrobenzene. Add four (4) parts of ferric chlorid and boil the whole for one (1) hour. Then work up the mixture as described in the foregoing example 1, whereupon a coloring matter is obtained which possesses properties similar to those of the coloring matter described in the said example 1.

Example 4. Heat fifty (50) parts of 1-di-acetyl-amido-2.4-di-brom-anthraquinone for one (1) hour at a temperature of two hundred and seventy (270) degrees centigrade. Allow the resulting melt to cool, powder it and extract the pure dyestuff by means of nitrobenzene. Then heat the powder with boiling sodium hypochlorite solution and filter. The coloring matter remains in the residue.

Example 5. Introduce five (5) parts of anhydrous sodium acetate, one (1) part of cuprous chlorid and five (5) parts of 1-acetyl-amido-2-brom-anthraquinone into seventy-five (75) parts of boiling nitrobenzene, and boil the whole for three (3) hours. When the mixture is cool, filter and wash the product successively with nitrobenzene, alcohol, water, dilute hydrochloric acid and water. The product can be obtained in a finely divided condition by dissolving it in sulfuric acid and then precipitating the solution by means of water.

Example 6. Introduce one part and a half (1.5) of lead oxid, two (2) parts of anhydrous lead acetate and five (5) parts of 1-di-acetyl-amido-2.4-di-brom-anthraquinone into seventy-five (75) parts of boiling nitrobenzene, and boil the whole for three (3) hours. When the mixture is cold, filter it and wash the product successively with nitrobenzene, alcohol, dilute acetic acid, and water.

Example 7. Introduce five (5) parts of anhydrous sodium acetate, one (1) part of cuprous chlorid and five (5) parts of 1-di-acetyl-amido-2.4-di-brom-anthraquinone into seventy-five (75) parts of boiling naphthalene, and boil the whole for three (3) hours. Then treat the melt with three hundred (300) parts of toluene and work up the whole as described in the foregoing example 5. The coloring matter so obtained is identical with that obtained in the foregoing example 6.

Example 8. Introduce fifteen (15) parts of sodium acetate, one part and a half (1.5) of cuprous chlorid and ten (10) parts of 1-acetyl-amido-2.4-di-brom-anthraquinone into one hundred (100) parts of boiling nitrobenzene. Boil the whole for three (3) hours, and work up as described in the foregoing example 5.

Now what I claim is:

1. The process of producing coloring matter of the anthracene series by treating a 1-acetyl-amido-anthraquinone body with an acid chlorid and heating the compound obtained.

2. The process of producing coloring matter of the anthracene series by treating a 1-acetyl-amido-anthraquinone body with an acid chlorid and heating the compound obtained with a condensing agent.

3. The process of producing coloring matter of the anthracene series by treating a 1-acetyl-amido-anthraquinone body with an acid chlorid and heating the compound obtained with a condensing agent in the presence of a solvent.

4. The process of producing coloring matter of the anthracene series by heating a 2-halogen-1-acetyl-amido-anthraquinone body.

5. The process of producing coloring matter of the anthracene series by heating a 2-halogen-1-acetyl-amido-anthraquinone body in the presence of a solvent.

6. The process of producing coloring matter of the anthracene series by treating 1-acetyl-amido-anthraquinone with phosphorus oxychlorid and heating the compound so obtained with aluminium chlorid in the presence of nitrobenzene.

7. The process of producing coloring matter of the anthracene series by heating 1-acetyl-amido-2-brom-anthraquinone with sodium acetate and cuprous chlorid in the presence of nitrobenzene.

8. As new articles of manufacture coloring matters of the anthracene series which can be obtained by treating a 1-acetyl-amido-anthraquinone body with an acid chlorid and heating the compound obtained, which coloring matters are insoluble in caustic alkali solution, soluble in concentrated sulfuric acid yielding from red to brown-red solutions, soluble in alkaline hydrosulfite solution yielding yellow-brown vats which dye cotton from orange to brown shades which shades upon treatment with neutral hydrosulfite solution become blue.

9. As a new article of manufacture the coloring matter of the anthracene series which can be obtained by treating 1-acetyl-amido-anthraquinone with phosphorusoxychlorid and heating the compound so obtained with aluminium chlorid in the presence of nitrobenzene, which coloring matter is insoluble in caustic alkali solution, soluble in concentrated sulfuric acid yielding a red solution, soluble in alkaline hydrosulfite solution yielding a yellow-brown vat which dyes cotton orange-yellow shades which shades upon treatment with neutral hydrosulfite solution become blue.

In testimony whereof I have hereunto set my hand in the presence of two subscribing witnesses.

FILIP KACER.

Witnesses:
J. ALEC LLOYD,
H. W. HARRIS.